May 13, 1941.  H. A. RUSH  2,241,479
BRAKE MECHANISM
Filed April 19, 1940   2 Sheets-Sheet 1
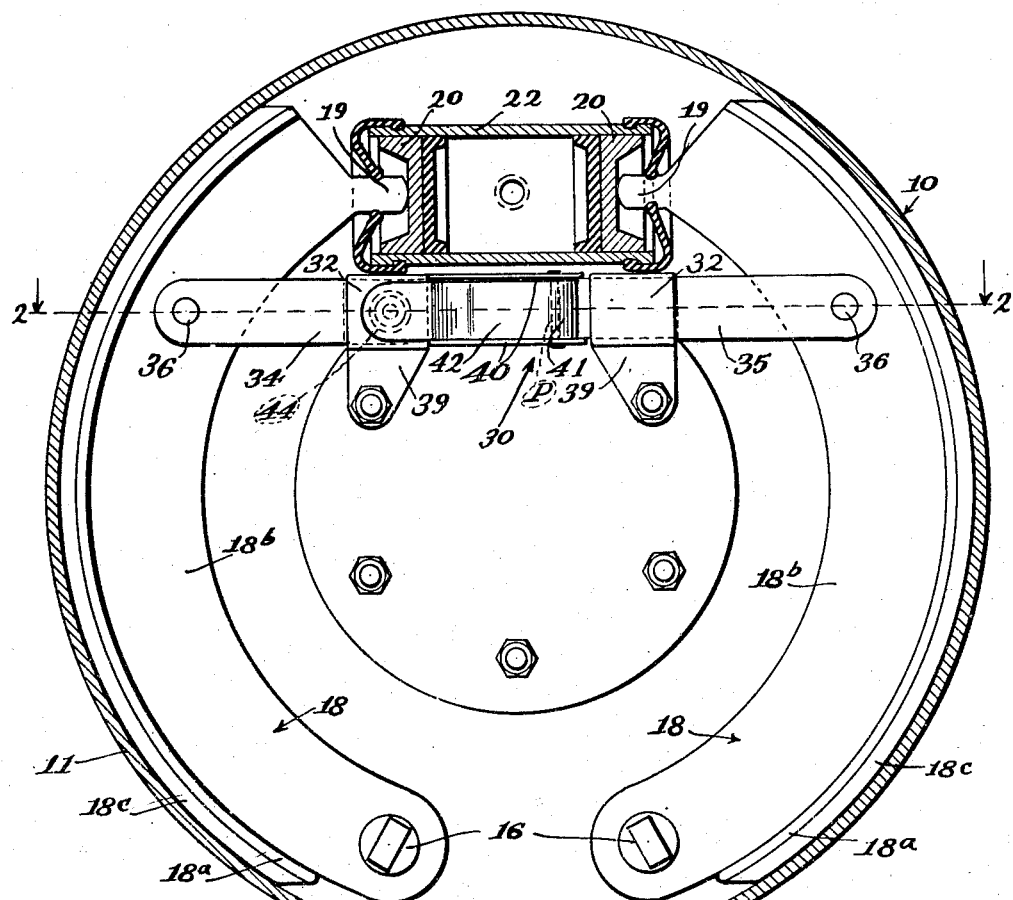
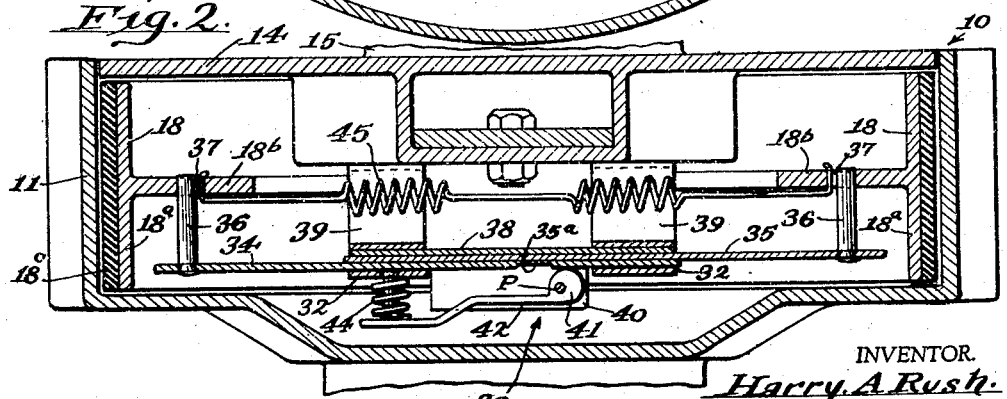
INVENTOR.
Harry A. Rush.
BY
ATTORNEY.

May 13, 1941.  H. A. RUSH  2,241,479
BRAKE MECHANISM
Filed April 19, 1940  2 Sheets-Sheet 2
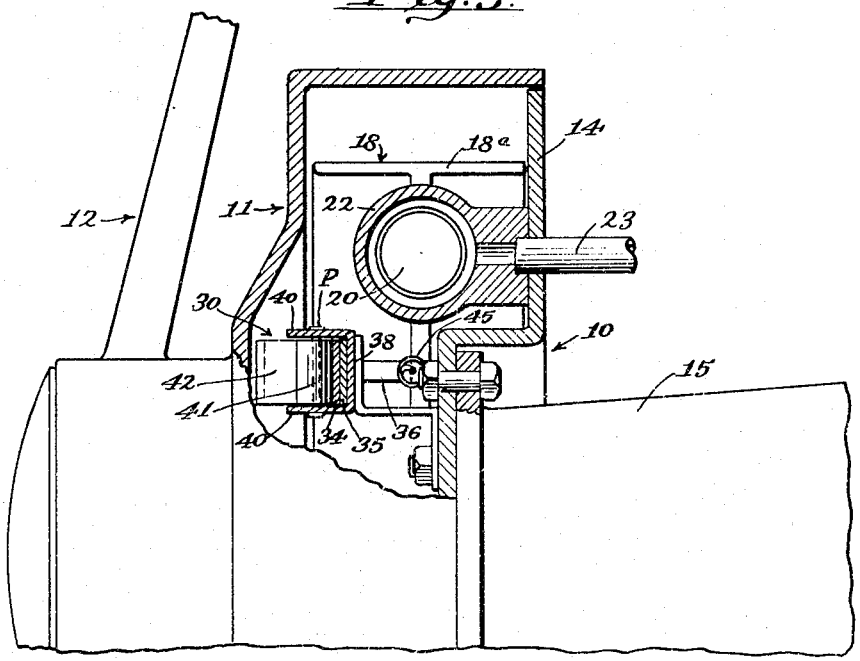
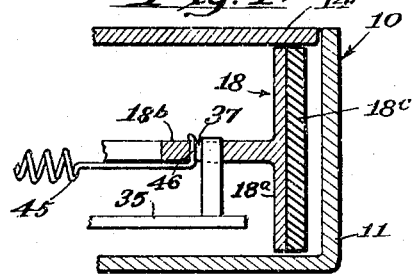
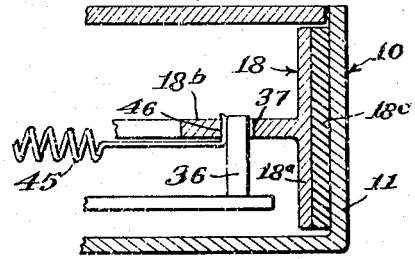
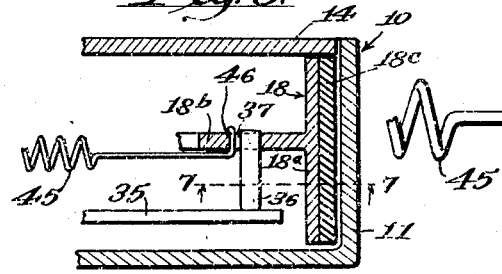
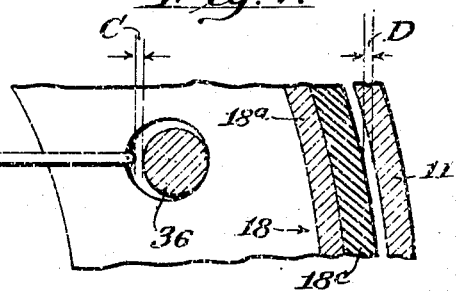
INVENTOR.
Harry A. Rush.
BY
ATTORNEY.

Patented May 13, 1941

2,241,479

UNITED STATES PATENT OFFICE 2,241,479

BRAKE MECHANISM

Harry A. Rush, Glendale, Calif.

Application April 19, 1940, Serial No. 330,582

9 Claims. (Cl. 188—79.5)

This invention relates to brakes for motor vehicles and more specifically to a brake shoe adjusting device which will maintain the outer face of the brake lining the same distance from the inner face of the drum at all times as the brake lining wears Heretofore numerous braking mechanisms of the character herein described have been constructed, and while they accomplish their desired purpose yet positive accuracy of adjustment is not possible, resulting in imperfect braking action, further it has been impossible to apply such mechanisms to the brakes of vehicles now in use without extensive alterations.

It is therefore an object of this invention to provide a frictionally controlled compensating apparatus for vehicle brakes which will automatically maintain the same distance between the outer face of the brake lining and the internal surface of the brake drum as the lining wears whereby an equal braking action will at all times be applied to each wheel brake.

Other objects and advantages will be apparent from the following description reference being had to the accompanying drawings in which:

Fig. 1 is a vertical section taken through a motor vehicle brake equipped with the improved adjusting apparatus.

Fig. 2 is a horizontal section taken on line 2—2 of Fig. 1.

Fig. 3 is a fragmentary side elevation parts being shown in section.

Figs. 4, 5 and 6 are detail sectional views illustrating the action of the adjusting apparatus.

Fig. 7 is an enlarged section taken on line 7—7 of Fig. 6.

Referring more specifically to the drawings 10 generally designates a vehicle braking mechanism of usual form comprising a brake drum 11 secured to the wheel 12 and a support, or so-called dust plate 14 attached to the rear axle housing 15 or other non-rotatable support when applied to the front wheels.

Pivotally connected at their lower ends as indicated at 16 to plate 14 are oppositely disposed segmental brake shoes 18, the upper or inwardly projecting reduced ends 19 of which engage the pistons 20 of a hydraulic cylinder 22 rigidly secured to said plate. Brake shoes 18 are of T shape in cross section comprising webs 18b and flanges 18a to each of which is a secured lining 18c.

It being understood that the cylinder 22 of the brake of each wheel of the vehicle is fluid in communication with the master cylinder (not shown) through tubes 23 in the usual manner.

The automatic compensating and adjusting device 30 of the present invention is secured to plate 14 in a suitable manner and as shown is constructed as follows. Slidably mounted in housings 32 and frictionally engaging each other are extensible bars or members 34 and 35 each of which has a pin 36 projecting from its outer end into an opening 37 formed in the webs 18b of the brake shoes. Secured to a plate 38 extending between the housings are brackets 39 that are in turn rigidly connected to the plate 14.

Pivotally mounted on a pin P extending between flanges 40 formed on plate 38 is a cam 41 that serves to hold the bars 34 and 35 in frictional engagement, the cam being formed on the end of an arm or lever 42 that is urged outwardly by an expansion spring 44.

Formed in the face of bar 35 is a depression or relieved portion 35a which when the brake lining has become worn to such an extent that it becomes dangerous to operate the vehicle the cam 41 will cease to function thereby indicating to the operator that such a condition exists when the brake pedal approaches the floor board.

Brake shoes 18 are interconnected by a retractile coil spring 45, which serves to hold the brake lining 18c of the brake shoes out of contact with the brake drum when pressure in the cylinder 22 is relieved, the ends 46 of the spring being hooked into the openings 37.

Referring more specifically to Fig. 7, it will be noted that the pins 36 on bars 34 and 35 of the adjusting apparatus 30 are of smaller diameter than the openings 37 in the webs 18b of the brake shoes also that there is clearance indicated at C between the inwardly turned ends 46 of the spring 45 and the pins 36.

When applying the apparatus to a brake of usual form, it is only necessary to adjust the bars in relation to each other so that the pins 36 will be approximately the same distance apart as the openings 37 in the brake shoes (see Fig. 4) inserting the pins therein and securing the brackets 40 to plate 14, a pair of the bolts utilized to secure the plate 14 to the axle housing 15 may be employed for this purpose.

In operation when the brakes are applied bars 34 and 35 will be moved outwardly in opposite directions due to engagement of the inwardly turned ends 46 of the spring 45 with the pins 36 as shown in Fig. 5. On the other hand when the brakes are released the brake shoes 18 and lining thereon are moved inwardly (by action of spring 45) until opposite sides of the openings 37 engage the pins 36 as clearly shown in Figs. 6 and 7, it being understood that the strength of spring 45 is insufficient to move the bars 34 and 35 inwardly.

As the cam 41 is yieldably urged against the bars 34 and 35 it will frictionally clamp the same to permit them to be automatically released in a brake applying direction and to be frictionally held in a brake releasing direction.

From the foregoing it will be seen that the distance between the face of the brake lining and drum indicated at C in Fig. 7 (when the brake is released) will be maintained at all times or until the lining has become worn to such an extent that it should be replaced.

It will be particularly noted that as the clearance between the brake lining and drum indicated at D is governed by the space C indicated in Fig. 7 equal application will be applied to each brake regardless of the wear on the respective linings.

While the brake adjuster has been shown and described in connection with a hydraulic braking system, it will be understood that it may be equally as well applied to mechanically operated brakes.

I claim:

1. In a hydraulic braking system, a source of fluid pressure in communication with a plurality of wheel brakes, each of said wheel brakes comprising a non-rotatable plate and a brake drum, a cylinder having a pair of pistons secured to said plate, brake shoes pivotally connected at one end to said plate with their opposite ends engaging the pistons of said cylinder, a spring normally urging said shoes out of engagement with said brake drum, a brake shoe adjuster secured to said plate including a pair of extensible bars inter-connected to said brake shoes, and means yieldably urged so as to permit the bars frictionally clamped thereby to be automatically released in a brake applying direction and to be frictionally held in a brake releasing direction.

2. In a hydraulic braking system, a source of fluid pressure in communication with a plurality of wheel brakes including a rotatable brake drum, a fixed plate, a hydraulic cylinder secured thereto having pistons therein, brake shoes pivotally connected to said plate and engaging the pistons in said cylinders, a brake shoe adjuster secured to said fixed plate comprising a pair of extensible bars frictionally engaging each other with their outer ends connected to said brake shoes, and a cam yieldably urged so as to permit the bars frictionally clamped thereby to be automatically released in a brake applying direction and to be frictionally held in a brake releasing direction, said extensible bars maintaining the brake shoes adjusted in relation to the brake drums.

3. In a hydraulic braking system, a source of fluid pressure in communication with a plurality of wheel brakes, including a rotatable brake drum, a fixed plate, a hydraulic cylinder secured thereto having a pair of pistons therein, a pair of brake shoes having a flange and a web pivotally mounted on said fixed plate, there being an opening in the web of each brake shoe, a retractile coil spring having its ends hooked into the openings in the webs of said brake shoes for retracting the same, a brake shoe adjuster secured to said fixed plate comprising a pair of extensible bars, each having a pin thereon of smaller diameter than the openings in said brake shoes and projecting thereinto, and means yieldably urged so as to permit the bars frictionally clamped thereby to be automatically released in a brake applying direction and to be frictionally held in a brake releasing direction.

4. In a hydraulic braking system, a source of fluid pressure in communication with a plurality of wheel brakes including a rotatable brake drum, a fixed plate, a hydraulic cylinder secured thereto having a pair of oppositely disposed pistons therein, a pair of brake shoes having openings in their webs pivotally connected at one to said fixed plate with their opposite ends engaging the pistons in said cylinders, a retractile coil spring having its ends hooked into the openings in said brake shoes, a brake shoe adjuster comprising a pair of extensible bars, housings slidably supporting said bars secured to said fixed plate, each of said bars having a pin projecting therefrom into the opening in said brake shoes, and a cam yieldably urged so as to permit the bars frictionally clamped thereby to be automatically released in a brake applying direction and to be frictionally held in a brake releasing direction.

5. In a braking apparatus a brake drum and a stationary plate associated therewith, brake shoes pivotally mounted on said plate for engagement with said drum, a brake actuating mechanism connected to said brake shoes, a pair of metal bars engaging each other, each bar having a pin projecting therefrom and engaging said shoes to move the bars on an operation of the brake actuating mechanism, and means yieldably urged so as to permit the bars frictionally clamped thereby to be automatically released in a brake applying direction and to be frictionally held in a brake releasing direction.

6. In a braking apparatus a rotatable brake drum and a stationary plate associated therewith, brake shoes mounted on said plate for engagement with said brake drum, a brake actuating mechanism connected to said brake shoes, a pair of metal bars engaging each other, each bar having a pin projecting therefrom and engaging said shoes to move the bars on an operation of the brake actuating mechanism, housings slidably supporting said bars secured to said stationary plate, and means yieldably urged so as to permit the bars frictionally clamped thereby to be released in a brake applying direction and to be frictionally held in a brake releasing direction.

7. In a braking apparatus a rotatable brake drum and a stationary plate associated therewith, a pair of brake shoes each having an opening therein pivotally connected at one end to said plate for engagement with said brake drum, a brake actuating mechanism engaging the opposite ends of said brake shoes, a pair of movable bars disposed in frictional engagement, each having a pin projecting therefrom into the openings of said shoes to move the bars on an operation of the brake actuating mechanism, and spring means yieldably urged so as to permit the bars frictionally clamped thereby to be automatically released in a brake applying direction and to be frictionally held in a brake releasing direction.

8. In a braking apparatus a rotatable brake drum and a stationary plate associated therewith, a pair of brake shoes pivotally connected at one end to said plate for engagement with said brake drum, a brake actuating mechanism engaging the opposite ends of said brake shoes, each of said brake shoes comprising a flange and a web with an opening therein, a pair of movable bars disposed in frictional relation, each having a pin of smaller diameter than the openings in the brake shoes and projecting thereinto to move the bars outwardly on an operation of the braking mechanism, and means yieldably urged so as to permit the bars frictionally clamped thereby to be automatically released in a brake applying direction and to be frictionally held in a brake releasing direction.

9. In a vehicle braking mechanism a plurality of fixed plates and brake drums, brake shoes pivotally mounted in said drums, fluid actuated means for operating said brake shoes, resilient means for normally holding said brake shoes out of engagement with said brake drums, a brake shoe adjusting mechanism secured to each of said plates including a pair of extensible bars arranged in frictional relation inter-connected to said brake shoes, and yieldably urged means to permit said frictionally clamped bars thereby to be automatically released in a brake applying direction and to be frictionally held in a brake releasing direction.

HARRY A. RUSH.